United States Patent
Lee et al.

(10) Patent No.: US 11,734,108 B2
(45) Date of Patent: Aug. 22, 2023

(54) SEMICONDUCTOR MEMORY APPARATUS AND OPERATION METHOD OF THE SEMICONDUCTOR MEMORY APPARATUS, AND MEMORY SYSTEM HAVING THE SEMICONDUCTOR MEMORY APPARATUS

(71) Applicant: SK hynix Inc., Icheon-si (KR)

(72) Inventors: Kwang Hun Lee, Icheon-si (KR); Ki Up Kim, Icheon-si (KR); Saeng Hwan Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 5 days.

(21) Appl. No.: 17/536,814

(22) Filed: Nov. 29, 2021

(65) Prior Publication Data

US 2022/0405167 A1  Dec. 22, 2022

(30) Foreign Application Priority Data

Jun. 21, 2021  (KR) .................. 10-2021-0080130

(51) Int. Cl.
*G06F 11/10* (2006.01)
*G06F 11/30* (2006.01)
*G06F 11/07* (2006.01)

(52) U.S. Cl.
CPC ........ *G06F 11/1068* (2013.01); *G06F 11/076* (2013.01); *G06F 11/0772* (2013.01); *G06F 11/3037* (2013.01)

(58) Field of Classification Search
CPC ............... G06F 11/1068; G06F 11/076; G06F 11/0772; G06F 11/3037
See application file for complete search history.

(56) References Cited

U.S. PATENT DOCUMENTS

| | | | |
|---|---|---|---|
| 2008/0162854 A1* | 7/2008 | Hashimoto | G11C 29/42 714/E11.038 |
| 2016/0124784 A1* | 5/2016 | Chung | G06F 11/1008 714/704 |
| 2018/0336960 A1* | 11/2018 | Chu | G06F 11/3034 |

FOREIGN PATENT DOCUMENTS

| | | |
|---|---|---|
| KR | 1020170056823 A | 5/2017 |
| KR | 1020190087180 A | 7/2019 |

* cited by examiner

*Primary Examiner* — Guy J Lamarre
(74) *Attorney, Agent, or Firm* — William Park & Associates Ltd.

(57) ABSTRACT

A semiconductor memory apparatus may include: a memory cell array; an ECC (Error Check and Correction) circuit configured to detect an error from data read from the memory cell array in response to a read command, correct the detected error, and output an error correction signal whenever an error is corrected; and an EF (Error Flag) generator configured to enter a flag output mode when the number of times that the error correction signal is generated during a monitoring period reaches a threshold, and output the error correction signal as an error flag in the flag output mode.

12 Claims, 10 Drawing Sheets

SEMICONDUCTOR MEMORY APPARATUS AND OPERATION METHOD OF THE SEMICONDUCTOR MEMORY APPARATUS, AND MEMORY SYSTEM HAVING THE SEMICONDUCTOR MEMORY APPARATUS

CROSS-REFERENCES TO RELATED APPLICATION

The present application claims priority under 35 U.S.C. § 119(a) to Korean application number 10-2021-0080130, filed on Jun. 21, 2021, in the Korean Intellectual Property Office, which is incorporated herein by reference in its entirety.

BACKGROUND

1. Technical Field

Various embodiments generally relate to a semiconductor integrated apparatus, and more particularly, to a semiconductor memory apparatus and an operation method of the semiconductor memory apparatus, and a memory system having the semiconductor memory apparatus.

2. Related Art

The logic level of data stored in a semiconductor memory apparatus may be inverted by various factors such as electrical or magnetic interference.

In order to detect and correct such data corruption, an ECC (Error Check and Correction) function has been developed.

An ECC circuit is configured to detect whether an error occurred and the location of the error, when data is read from a memory apparatus, and output read data corrected by returning the value of the data at the location, where the error occurred, to a correct value.

When data stored in the memory apparatus is corrupted or lost it degrades the reliability of the memory apparatus. Therefore, there is a need for a method capable of preventing an occurrence of fatal error by efficiently managing error information.

SUMMARY

In an embodiment, an semiconductor memory apparatus may include: a memory cell array; an ECC (Error Check and Correction) circuit configured to detect an error from data read from the memory cell array in response to a read command, correct the detected error, and output an error correction signal whenever an error is corrected; and an EF (Error Flag) generator configured to enter a flag output mode when the number of times that the error correction signal is generated during a monitoring period reaches a threshold, and output the error correction signal as an error flag in the flag output mode.

In an embodiment, a semiconductor memory apparatus may include: a memory cell array; an ECC circuit configured to detect an error from data read from the memory cell array in response to a read command, correct the detected error, and output an error correction signal whenever an error is corrected; and an EF generator configured to output the error correction signal as an error flag during at least a portion of a monitoring period, after the number of times that the error correction signal is generated during the monitoring period reaches a threshold.

In an embodiment, an operation method of a semiconductor memory apparatus may include the steps of: detecting an error from data read from a memory cell array in response to a read command; outputting an error correction signal whenever an error is corrected; entering a flag output mode when the number of times that the error correction signal is generated during a monitoring period reaches a threshold; and outputting the error correction signal as an error flag in the flag output mode.

In an embodiment, a memory system may include: a semiconductor memory apparatus; and a memory controller configured to control the semiconductor memory apparatus. The semiconductor memory apparatus may include: a memory cell array; an ECC circuit configured to detect an error from data read from the memory cell array in response to a read command, correct the detected error, and output an error correction signal whenever an error is corrected; and an EF generator configured to enter a flag output mode when the number of times that the error correction signal is generated during a monitoring period reaches a threshold, and generate the error correction signal and output the error correction signal as an error flag to the memory controller in the flag output mode.

DETAILED DESCRIPTION

Hereafter, examples of embodiments of the present technology will be described in more detail with reference to the accompanying drawings.

Figure 1:
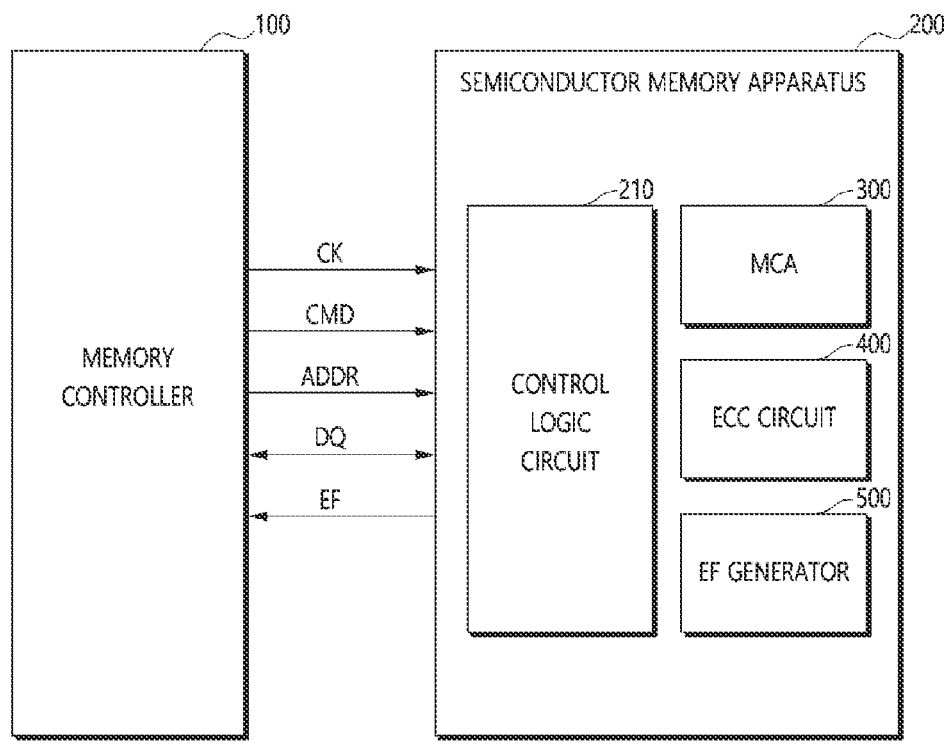
FIG. 1 is a configuration diagram illustrating a memory system in accordance with an embodiment.

FIG. 1 is a configuration diagram illustrating a memory system in accordance with an embodiment.

Referring to FIG. 1, a memory system 10 may include a memory controller 100 and one or more semiconductor memory apparatuses 200.

The memory controller 100 may be configured to control overall operations of the memory system 10, and control data exchange between the semiconductor memory apparatus 200 and a host (not illustrated). For example, the memory controller 100 may control the memory apparatus 200 to write data thereto or read data stored therein, according to a request of the host.

The semiconductor memory apparatus 200 may include a semiconductor memory apparatus selected among a DRAM (Dynamic Random Access Memory), DDR4 (Double Data Rate 4) SDRAM (Synchronous DRAM), LPDDR4 (Low Power DDR4) SDRAM, LPDDR5 SDRAM, DDR5 SDRAM, GDDR (Graphics DDR) and SRAM.

The memory controller 100 may transmit a clock signal CK, a command CMD and an address ADDR to the semiconductor memory apparatus 200, and exchange data DQ with the semiconductor memory apparatus 200. The semiconductor memory apparatus 200 may generate an error flag EF through an ECC operation which is performed during a data read operation, and transmit the generated error flag EF to the memory controller 100.

That is, the error flag EF may include information on detection and/or correction of one or more error bits which occurred in data read from a MCA (Memory Cell Array) 300. In an embodiment, the error flag EF may include information on whether one or more error bits were detected, and information on whether the one or more error bits were corrected, when the one or more error bits were detected.

The semiconductor memory apparatus 200 may include a control logic circuit 210, the MCA 300, an ECC circuit 400 and an EF generator 500. The MCA 300 may store data therein.

The control logic circuit 210 may control an operation of the semiconductor memory apparatus 200. For example, the control logic circuit 210 may generate control signals for controlling the semiconductor memory apparatus 200 to perform a write operation or read operation.

The ECC circuit 400 may read data from a target page of the MCA 300 and decode the read data through ECC decoding, under control of the control logic circuit 210. When having corrected an error contained in the decoded data, the ECC circuit 400 may transmit an error correction signal CE to the EF generator 500.

The EF generator 500 may generate an error flag EF on the basis of a read command RD transmitted from the control logic circuit 210 and the error correction signal CE provided from the ECC circuit 400.

In an embodiment, when the number of correctable error bits which occur during a preset monitoring period reaches a threshold, the EF generator 500 may enable an EF output mode to output the error flag EF. The EF output mode may be enabled during at least the monitoring period in which the number of correctable error bits has reached the threshold. In another embodiment, the EF output mode may be enabled during a tracking monitoring period and the monitoring period in which the number of correctable error bits has reached the threshold. The tracking monitoring period may be a subsequent monitoring period. The word "preset" as used herein with respect to a parameter, such as a preset monitoring period or preset number, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

In an embodiment, the monitoring period may be decided on the basis of the number of read operations. The monitoring period, the threshold and the tracking monitoring period may be set, changed or programmed through a fuse option, an MRS (Mode Register Set) or the like.

Figure 2:
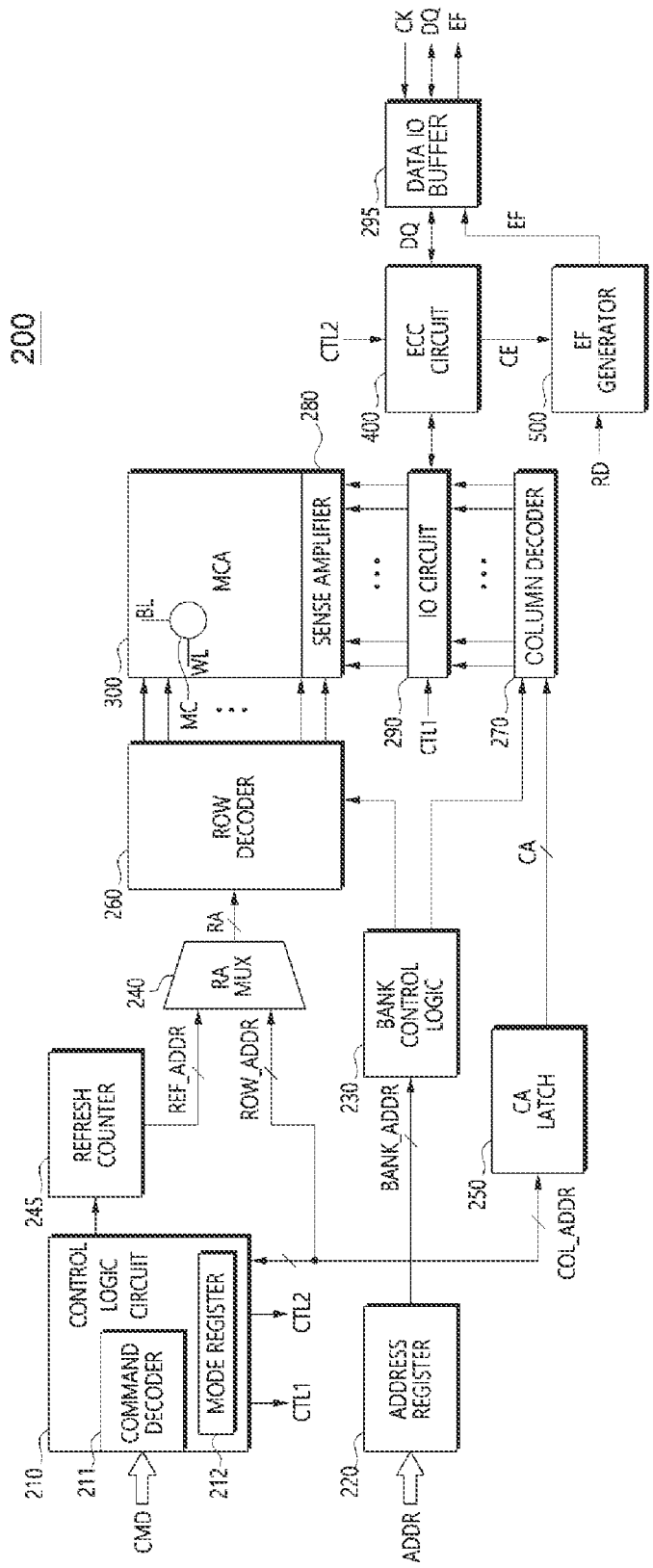
FIG. 2 is a configuration diagram illustrating a semiconductor memory apparatus in accordance with an embodiment.

FIG. 2 is a configuration diagram illustrating a semiconductor memory apparatus in accordance with an embodiment.

Referring to FIG. 2, the semiconductor memory apparatus 200 in accordance with the present embodiment may include a control logic circuit 210, an address register 220, a bank control logic 230, a refresh counter 245, a row address multiplexer 240, a column address latch 250, a row decoder 260, a column decoder 270, a MCA 300, a sense amplifier 280, an IO circuit 290, an ECC circuit 400, a data IO buffer 295 and an EF generator 500.

The MCA 300 may include a plurality of banks. The row decoder 260, the column decoder 270 and the sense amplifier 280 may be configured to correspond to each of the plurality of banks.

The MCA 300 may include a plurality of word lines WL, a plurality of bit lines BL, and a plurality of memory cells MC coupled to the respective intersections between the word lines WL and the bit lines BL.

The address register 220 may receive an address ADDR including a bank address BANK_ADDR, a row address ROW_ADDR and a column address COL_ADDR from the memory controller 100, and provide the bank address BANK_ADDR, the row address ROW_ADDR and the column address COL_ADDR to the bank control logic 230, the row address multiplexer 240 and the column address latch 250, respectively.

The bank control logic 230 may generate bank control signals in response to the bank address BANK_ADDR. In response to the bank control signals, the row decoder 260 and the column decoder 270, which correspond to an access target bank, may be enabled.

The row address multiplexer 240 may receive the row address ROW_ADDR from the address register 220, and receive the refresh row address REF_ADDR from the refresh counter 245. The row address multiplexer 240 may selectively output the row address ROW_ADDR or the refresh row address REF_ADDR as a row address RA. The row address RA output from the row address multiplexer 240 may be applied to the row decoder 260.

The row decoder 260 may decode the row address RA output from the row address multiplexer 240, and enable a word line corresponding to the row address RA.

The column address latch 250 may receive the column address COL_ADDR from the address register 220, and temporarily store the received column address COL_ADDR therein. The column address CA output from the column address latch 250 may be applied to the column decoder 270.

The column decoder 270 may enable the sense amplifier 280 corresponding to the bank address BANK_ADDR and the column address CA.

The IO circuit 290 may include read data latches for storing data output from the MCA 300 and write drivers for writing data to the MCA 300.

The data read from the MCA 300 may be sensed by the sense amplifier 280, and stored in a read data latch of the IO circuit 290. The ECC circuit 400 may decode the data, stored in the read data latch, through ECC decoding, and transmit the error correction signal CE to the EF generator 500.

The EF generator 500 may generate the error flag EF in response to the read command RD and the error correction signal CE, and apply the generated error flag EF to the data IO buffer 295.

During a write operation, the data IO buffer 295 may receive the data DQ in synchronization with the clock signal CK provided from the memory controller 100, and provide the received data DQ to the ECC circuit 400.

The ECC circuit 400 performs an encoding operation to generate parity bits based on the data DQ, and provides the write data and the parity bits to the IO circuit 290 such that the write data and the parity bits are written to the MCA 300.

During a read operation, the ECC circuit 400 performs ECC decoding on the basis of data and parity bits, which are read from a target region of the MCA 300. When one or more error bits are contained in the decoded data, the ECC circuit 400 may correct the one or more error bits. In this case, the ECC circuit 400 may generate the error correction signal CE and provide the generated error correction signal CE to the EF generator 500.

The data IO buffer 295 may receive the read data DQ and the error flag EF, and transmit the received data and error flag to the memory controller 100.

The control logic circuit 210 may control an operation of the semiconductor memory apparatus 200. For example, the control logic circuit 210 may generate control signals for controlling the semiconductor memory apparatus 200 to perform a write operation or read operation. The control logic circuit 210 may include a command decoder 211 for decoding the command CMD received from the memory controller 100 and a mode register 212 for setting the operation mode of the semiconductor memory apparatus 200.

For example, the command decoder 211 may generate control signals corresponding to the command CMD by decoding a write enable signal, a row address strobe signal, a column address strobe signal, a chip select signal and the like.

The control signals may include a first control signal CTL1 for controlling the IO circuit 290 and a second control signal CTL2 for controlling the ECC circuit 400.

Figure 3:
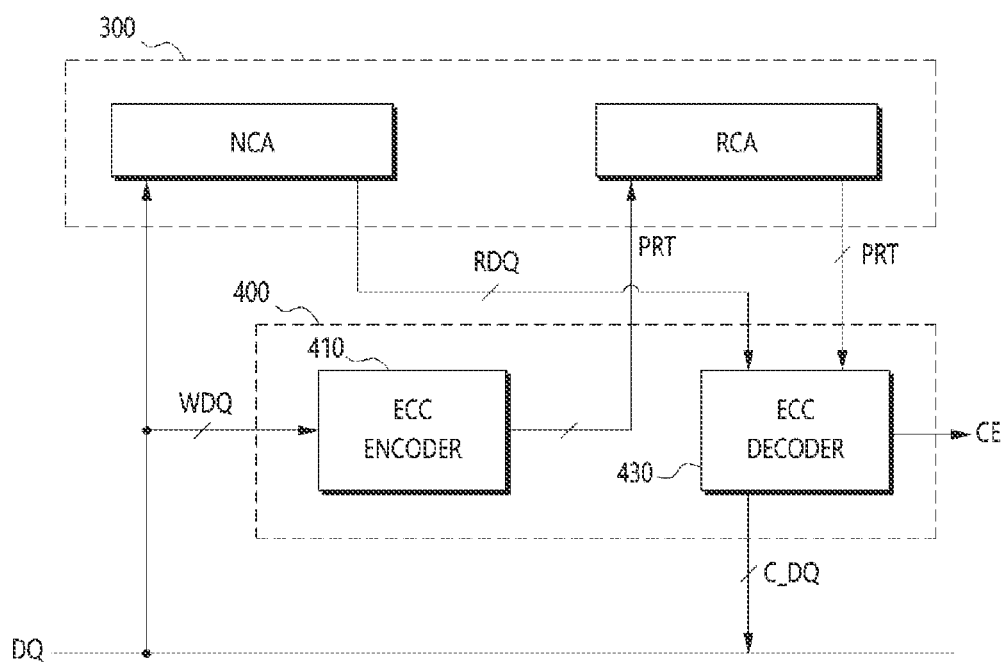
FIG. 3 is a configuration diagram illustrating an ECC circuit in accordance with an embodiment.

FIG. 3 is a configuration diagram illustrating an ECC circuit in accordance with an embodiment.

Referring to FIG. 3, the ECC circuit 400 may include an ECC encoder 410 and an ECC decoder 430.

FIG. 3 illustrates the MCA 300 including a normal cell array NCA and a redundancy cell array RCA with the ECC circuit 400.

The ECC encoder 410 may generate parity bits PRT related to write data WDQ which are to be stored in the normal cell array NCA. The parity bits PRT may be stored in the redundancy cell array RCA.

The ECC decoder 430 may decode the read data RDQ through ECC decoding by using the read data RDQ and the parity bits PRT, which are read from the MCA 300. As the result of the ECC decoding, the ECC decoder 430 may correct one or more error bits contained in the read data RDQ. In this case, the ECC decoder 430 may output the error correction signal CE. The ECC decoder 430 may also output the corrected data C_DQ obtained by correcting the one or more bits.

Figure 4:
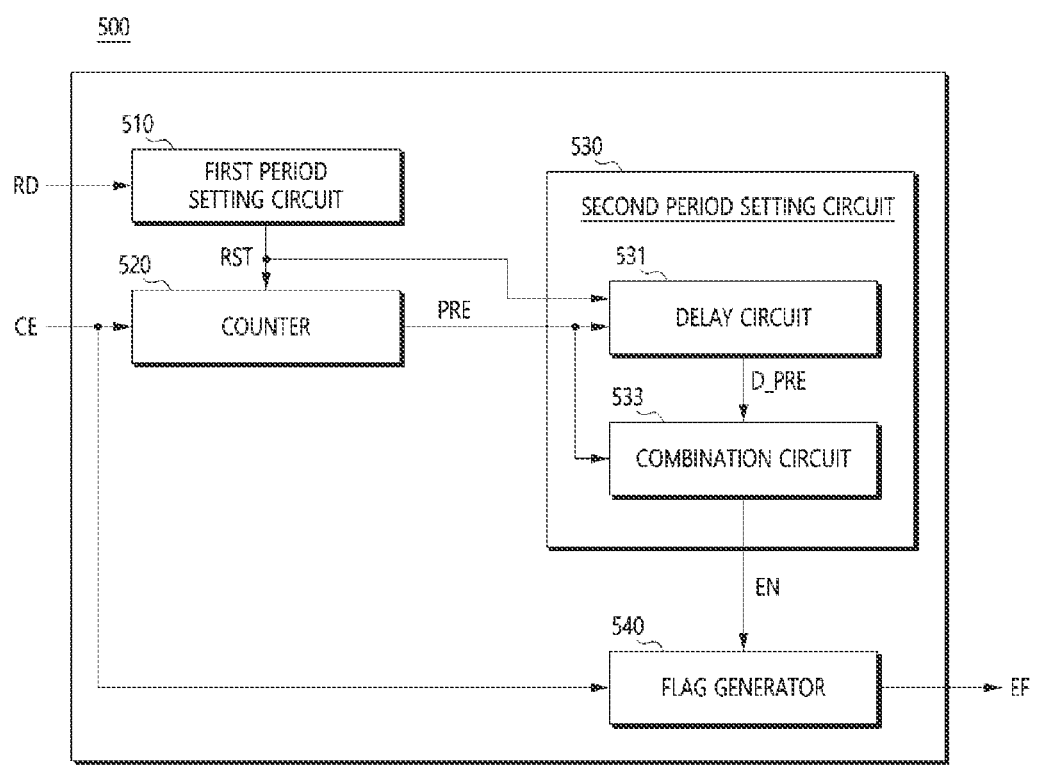
FIG. 4 is a configuration diagram illustrating an EF (Error Flag) generator in accordance with an embodiment.

FIG. 4 is a configuration diagram illustrating an EF generator in accordance with an embodiment.

Referring to FIG. 4, the EF generator 500 in accordance with the embodiment may include a first period setting circuit 510, a counter 520, a second period setting circuit 530 and a flag generator 540.

The first period setting circuit 510 may be configured to set and reset the period in which an error detection and correction condition is monitored. For example, the first period setting circuit 510 may be configured to count the number of times that a read command is input, and output a reset signal RST when the number of times that the read command is input reaches a preset count. That is, a time period required until the number of times that the read command is input reaches the preset count may be set to the monitoring period, but the present embodiment is not limited thereto.

The counter 520 may count the number of times that the error correction signal CE provided from the ECC circuit 400 is generated. When the number of times that the error correction signal CE is generated reaches a threshold, the counter 520 may activate a pre-signal PRE. The counter 520 may be reset in response to the reset signal RST received from the first period setting circuit 510. Therefore, when the number of times that the error correction signal CE is generated during a first monitoring period reaches the threshold, the counter 520 may activate the pre-signal PRE. As the first monitoring period ends, the counter 520 may reset the pre-signal PRE.

The second period setting circuit 530 may be configured to generate an output enable signal EN by delaying an active period of the pre-signal PRE during a tracking monitoring period, in response to the reset signal RST. The tracking monitoring period may at least include a monitoring period following the previous monitoring period.

In an embodiment, the second period setting circuit 530 may include a delay circuit 531 and a combination circuit 533.

The delay circuit 531 may receive the pre-signal PRE, and generate a delayed pre-signal D_PRE by delaying the active period of the pre-signal PRE by the tracking monitoring period in response to the reset signal RST. From another point of view, the delay circuit 531 may be configured to retain the logic level of the pre-signal PRE during the tracking monitoring period corresponding to the monitoring period, and output the delayed pre-signal D_PRE, when the pre-signal PRE is activated.

From another point of view, the delay circuit 531 may receive a first pre-signal PRE and output the received signal, in response to a first reset signal RST which is generated as the first monitoring period ends. The delay circuit 531 may retain the output of the first pre-signal PRE until a second reset signal RST is provided after a second monitoring period following the first monitoring period ends, and output a first delayed pre-signal D_PRE.

That is, the second period setting circuit 530 may be configured to output the pre-signal PRE, generated at a specific level in the previous monitoring period, during the current monitoring period.

The combination circuit 533 may generate the output enable signal EN by combining the pre-signal PRE and the delayed pre-signal D_PRE. When the pre-signal PRE is activated in the first monitoring period, the output enable signal EN may retain the activated state during the first monitoring period and the tracking monitoring period. In an embodiment, the tracking monitoring period may include one or more monitoring periods.

The flag generator 540 may be configured to output the error correction signal CE as the error flag EF in response to the output enable signal EN.

In an embodiment, when the number of times that the error correction signal CE is generated in the first monitoring period reaches the threshold, the pre-signal PRE output from the counter 520 may be activated. When the first monitoring period ends, the first period setting circuit 510 may output the first reset signal RST to reset the counter 520, and the pre-signal PRE may be inactivated.

The delay circuit 531 of the second period setting circuit 530 may output the delayed pre-signal D_PRE which retains the logic level of the activated pre-signal PRE until the tracking monitoring period corresponding to the first monitoring period. That is, the delay circuit 531 may extend the active period of the pre-signal PRE to a time period from the point of time that the first reset signal RST is generated after the first monitoring period to the point of time that the second reset signal RST is generated after the second monitoring period, and output the delayed pre-signal D_PRE.

The combination circuit 533 may output the output enable signal EN synchronized with a time period from the point of time that the pre-signal PRE is activated to the point of time that the delayed pre-signal PRE is inactivated, in response to the pre-signal PRE and the delayed pre-signal D_PRE.

During the period in which the output enable signal EN is enabled, the flag generator 540 may output the error flag EF whenever the error correction signal CE is input.

Figure 5:
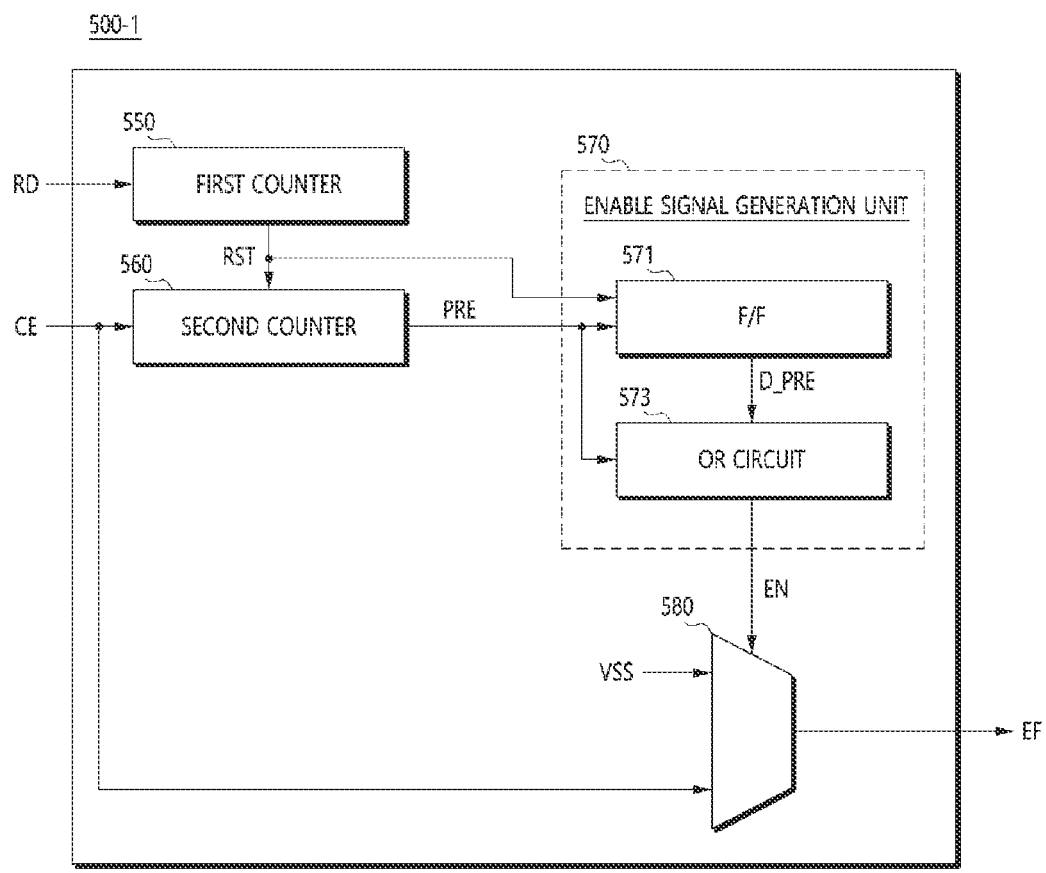
FIG. 5 is a configuration diagram illustrating an EF generator in accordance with an embodiment.

FIG. 5 is a configuration diagram illustrating an EF generator in accordance with an embodiment.

Referring to FIG. 5, an error flag generation circuit 500-1 in accordance with the present embodiment may include a first counter 550, a second counter 560, an enable signal generation unit 570 and a selection unit 580.

The first counter 550 may be configured to count the number of times that the read command RD is input, and output the reset signal RST when the number of times that the read command RD is input reaches a preset count.

The second counter 560 may be configured to activate the pre-signal PRE when the number of times that the error correction signal CE provided from the ECC circuit 400 is generated reaches a preset threshold. The second counter 560 may be reset in response to the reset signal RST provided from the first counter 550.

The enable signal generation unit 570 may include a flip-flop circuit 571 and an OR circuit 573.

The flip-flop circuit 571 may be configured to store the pre-signal PRE in response to the first reset signal RST which is generated after the first monitoring period ends, and output the pre-signal PRE as the delayed pre-signal D_PRE until the second reset signal RST is generated after the second monitoring period following the first monitoring period ends.

The OR circuit 573 may generate the output enable signal EN by performing an OR operation on the pre-signal PRE and the delayed pre-signal D_PRE.

The selection unit 580 may be configured to receive a ground voltage signal VSS and the error correction signal CE, and select the error correction signal CE and output the selected signal as the error flag EF, when the output enable signal EN is activated.

In an embodiment, the counts of the first and second counters 550 and 560 may be set, changed or programmed through a fuse option, an MRS or the like.

Figure 6:
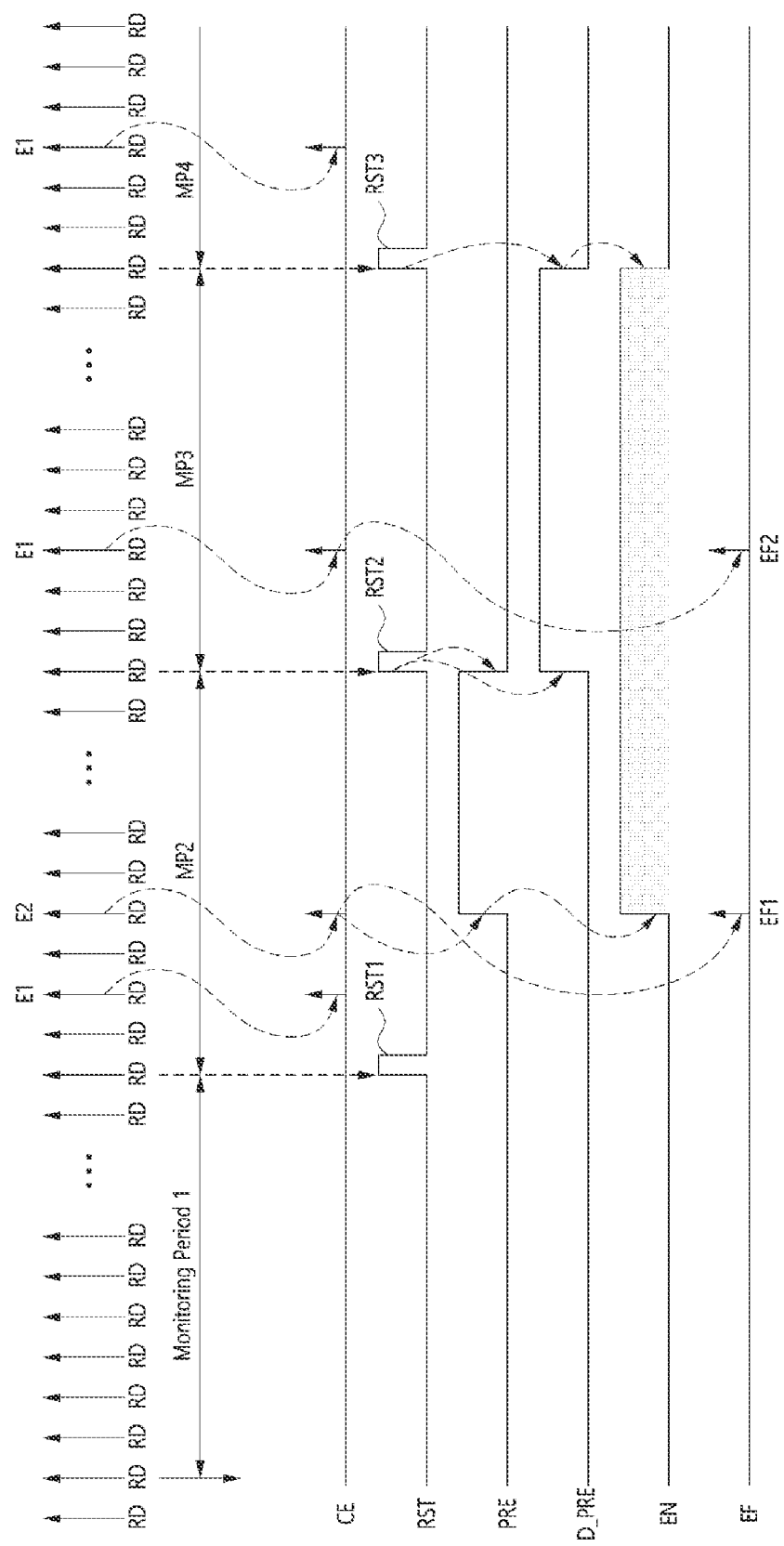
FIG. 6 is a timing diagram for describing the operation concept of the EF generator in accordance with the embodiment.

FIG. 6 is a timing diagram for describing the operation concept of the EF generator in accordance with the embodiment.

When a correctable error occurs while data is read from the memory cell array in response to the read command RD, the ECC circuit 400 outputs the error correction signal CE.

Referring to FIG. 6, the pre-signal PRE retains an inactivated state during a first monitoring period Monitoring Period 1, because no error correction signal CE was generated during the first monitoring period Monitoring Period 1.

After the first monitoring period Monitoring Period 1 ends, the second monitoring period MP2 starts. When it is detected that the number of correctable errors E1 and E2, which occurred in the data, reaches a threshold before the second monitoring period MP2 ends, the pre-signal PRE is activated. The pre-signal PRE may retain the activated state during the second monitoring period MP2, and be reset according to the second reset signal RST2.

The delayed pre-signal D_PRE may be generated by extending the output period of the pre-signal PRE to the tracking monitoring period, for example, the next monitoring period. That is, the EF generator may receive the pre-signal PRE generated in the second monitoring period MP2 according to the second reset signal RST2, retain the received signal until a third reset signal RST3 is generated after a third monitoring period MP3 ends, and output the delayed pre-signal D_PRE.

During the period in which the output enable signal EN obtained by combining the pre-signal PRE and the delayed pre-signal D_PRE is activated, the EF generator may output the error flag EF whenever the error correction signal CE is input. In an embodiment, during the period in which the output enable signal EN is activated, the error flag generator enters a flag output mode whereby the error flag generator may output the error flag EF whenever the error correction signal CE is input. In an embodiment, the flag output mode is considered enabled during the period in which the output enable signal EN is activated, and thus, the error flag generator has entered a flag output mode whereby the error flag generator may output the error flag EF whenever the error correction signal CE is input. As such, in an embodiment, a flag output mode enabled may indicate the period in which the output enable signal EN is activated and the error flag generator has entered the flag output mode whereby the error flag generator may output the error flag EF whenever the error correction signal CE is input.

Referring to FIG. 6, an error flag EF1 is output when the pre-signal PRE is activated in the second monitoring period MP2. Since the number of times that the error correction signal CE is generated in the third monitoring period MP3 is less than the threshold, the output enable signal EN is activated until the third monitoring period MP3. Furthermore, the error correction signal CE generated in the third monitoring period MP3 is output as an error flag EF2.

Figure 7:
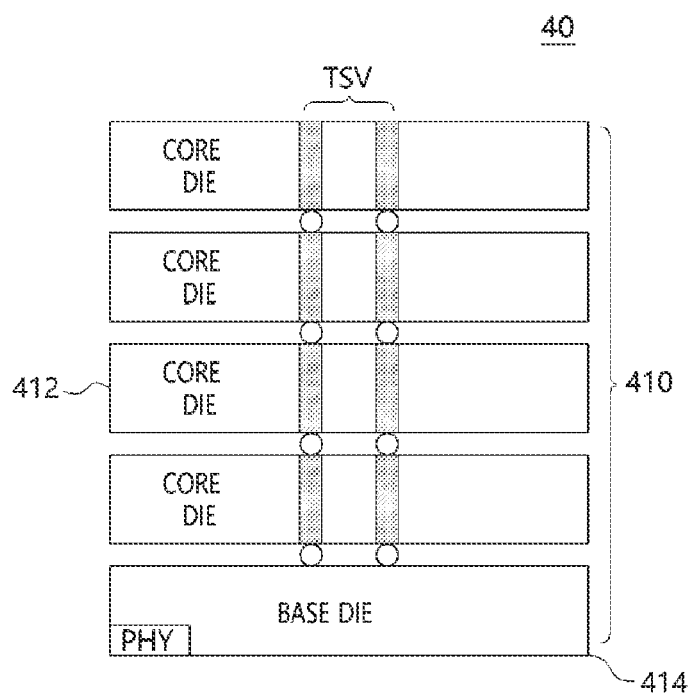
FIGS. 7, 8, and 9 illustrate stacked semiconductor apparatuses in accordance with embodiments.
Figure 8:
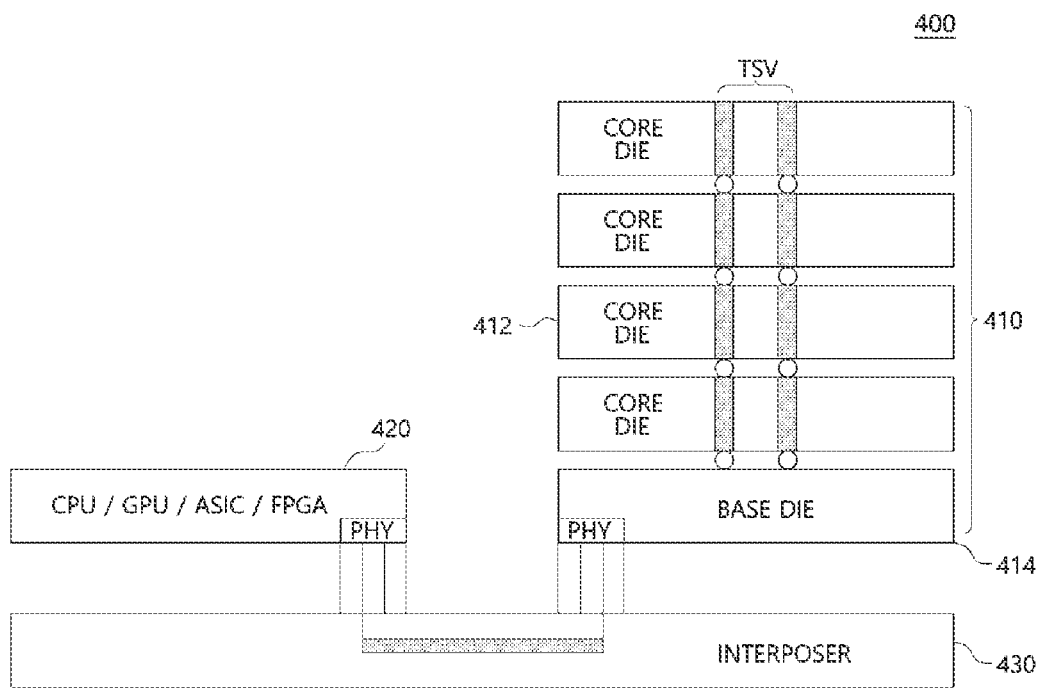
Figure 9:
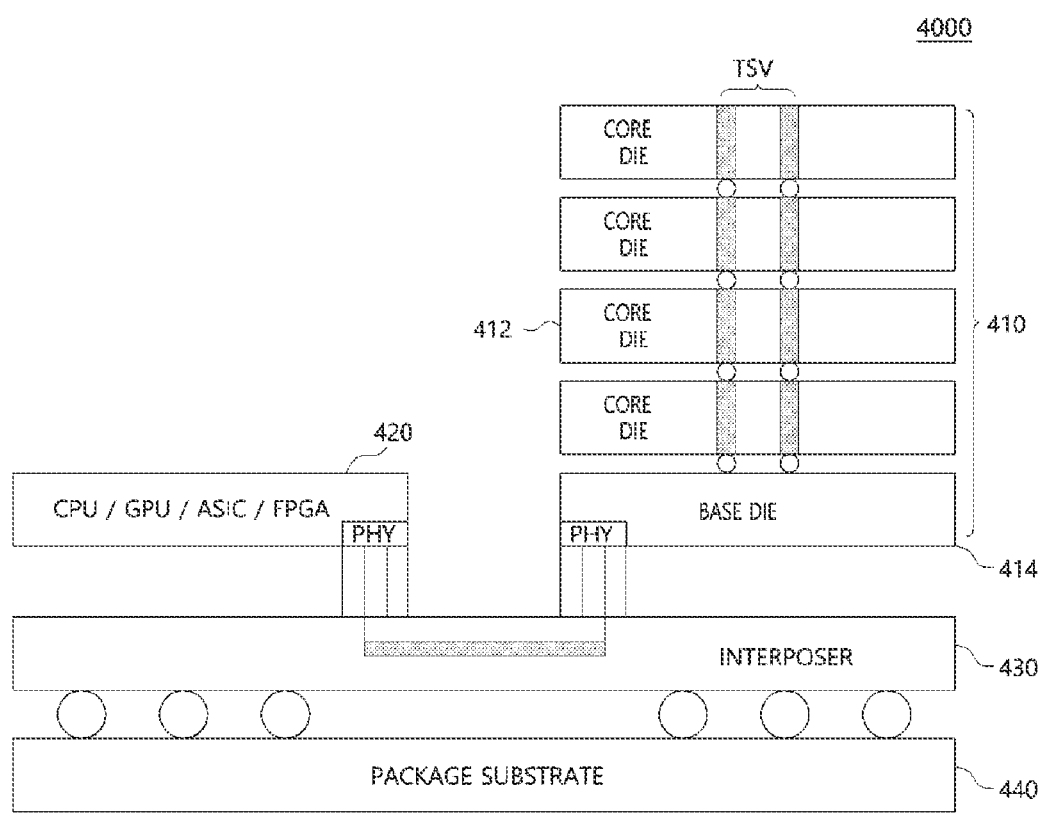

FIGS. 7 to 9 illustrate stacked semiconductor apparatuses in accordance with embodiments.

FIG. 7 illustrates a stacked semiconductor apparatus 40 in accordance with an embodiment.

The stacked semiconductor apparatus 40 may include a stack structure 410 in which a plurality of memory dies are stacked. The stack structure 410 may be configured in a high bandwidth memory (HBM) type or hybrid memory cube (HMC) type in which the plurality of dies are stacked and electrically connected to one another via through-silicon vias (TSV), so that the number of input/output units is increased and thus a bandwidth is increased.

The stack structure 410 may include a base die 414 and a plurality of core dies 412.

The plurality of core dies 412 may be stacked on the base die 414 and electrically connected to one another via the through-silicon vias (TSV). In each of the core dies 412, memory cells for storing data and circuits for core operations of the memory cells may be disposed.

The core dies 412 may be electrically connected to the base die 414 via the through-silicon vias (TSV) and receive signals, power and the like from the base die 414 via the through-silicon vias (TSV).

The base die 414, for example, may include the controller 100 and the memory apparatus 200 illustrated in FIGS. 1 to 5. The base die 414 may perform various functions in the stacked semiconductor apparatus 40, for example, memory management functions such as power management and refresh of the memory cells or timing adjustment functions between the core dies 412 and the base die 414.

A physical interface area PHY included in the base die 414 may be an input/output area of an address, a command, data, a control signal and the like. The physical interface area PHY may be provided with a predetermined number of input/output circuits capable of satisfying a data processing speed required for the stacked semiconductor apparatus 40.

A plurality of input/output terminals and a power supply terminal may be provided in the physical interface area PHY on the rear surface of the base die 414 to receive signals and power required for an input/output operation.

FIG. 8 illustrates a stacked semiconductor apparatus 400 in accordance with an embodiment.

The stacked semiconductor apparatus 400 may include a stacked structure 410 including a plurality of core dies and a base die, a memory host 420, and an interface substrate 430. The memory host 420 may be a central processing unit (CPU), a graphics processing unit (GPU), an application specific integrated circuit (ASIC), a field programmable gate array (FPGA) and the like.

The base die may be provided with a circuit for an interface between the core dies and the memory host 420. The stacked structure 410 may have a structure similar to that described with reference to FIG. 7.

A physical interface area PHY of the stacked structure 410 and a physical interface area PHY of the memory host 420 may be electrically connected to each other through the interface substrate 430. The interface substrate 430 may be referred to as an interposer.

FIG. 9 illustrates a stacked semiconductor apparatus 4000 in accordance with an embodiment.

It may be understood that the stacked semiconductor apparatus 4000 illustrated in FIG. 9 may be obtained by disposing the stacked semiconductor apparatus 400 illustrated in FIG. 8 on a package substrate 440.

The package substrate 440 and the interface substrate 430 may be electrically connected to each other through connection terminals.

A system in package (SiP) type semiconductor apparatus may be implemented by stacking the stacked structure 410 and the memory host 420, which are illustrated in FIG. 8, on the interface substrate 430 and mounting them on the package substrate 440 for the purpose of packaging.

Figure 10:
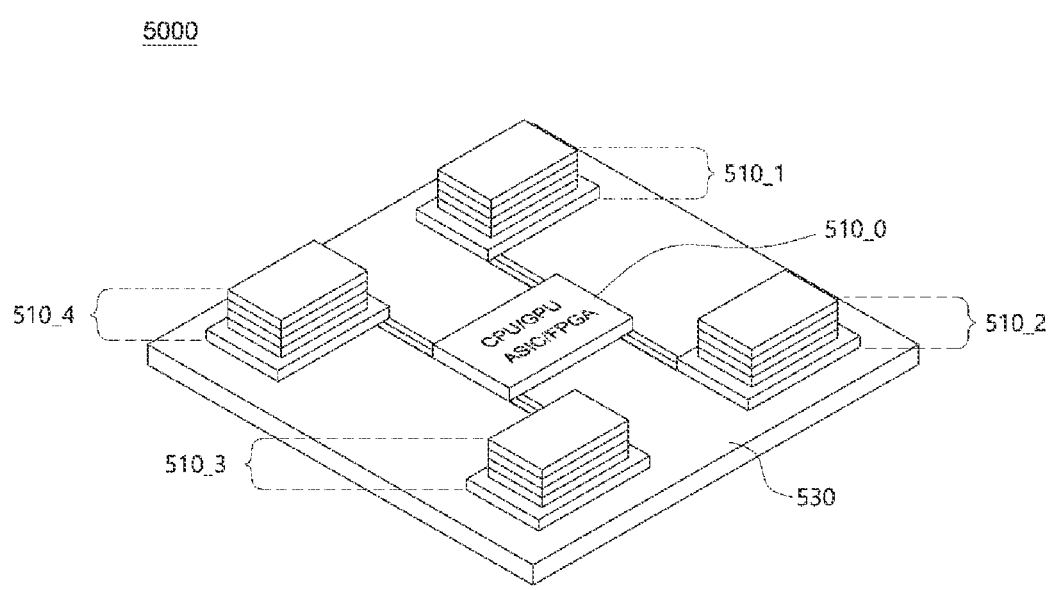
FIG. 10 is views illustrating a processing system in accordance with examples of embodiments.

FIG. 10 is views illustrating a processing system in accordance with examples of embodiments.

Referring to FIG. 10, a processing system 5000 of examples of embodiments may include four stacked memory structures 510_1, 510_2, 510_3 and 510_4 connected to at least one main processor 510_0. The main processor 510 may be arranged on an interposer 530.

Each of the stacked memory structures 510_1, 510_2, 510_3 and 510_4 may include the base die and the plurality of memory dies stacked on the base die of above examples of embodiments.

While various embodiments have been described above, it will be understood to those skilled in the art that the embodiments described are examples only. Accordingly, the semiconductor memory apparatus, the operation method and the memory system, which have been described herein, should not be limited based on the described embodiments.

What is claimed is:

1. A semiconductor memory apparatus comprising:
   a memory cell array;
   an ECC (Error Check and Correction) circuit configured to detect an error from data read from the memory cell array in response to a read command, correct the detected error, and output an error correction signal whenever an error is corrected; and
   an EF (Error Flag) generator configured to enter a flag output mode when the number of times that the error correction signal corresponding to each of read command is generated during a monitoring period in which a preset number of read commands are input reaches a threshold, and output the error correction signal as an error flag in the flag output mode,
   wherein the error correction signal is generated when the error in the data read in response to the read command is correctable and the error of the read data is corrected.

2. The semiconductor memory apparatus according to claim 1, wherein the flag output mode is initially entered in a first monitoring period and is continuously maintained in the flag output mode until at least the first monitoring period after the initially entered.

3. The semiconductor memory apparatus according to claim 1, wherein the flag output mode enabled in a first monitoring period is retained during the first monitoring period and a tracking monitoring period.

4. The semiconductor memory apparatus according to claim 3, wherein the tracking monitoring period is set to a second monitoring period following the first monitoring period.

5. A semiconductor memory apparatus comprising:
   a memory cell array;
   an ECC (Error Check and Correction) circuit configured to detect an error from data read from the memory cell array in response to a read command, correct the detected error, and output an error correction signal corresponding to each of read command whenever an error is corrected; and
   an EF (Error Flag) generator configured to output the error correction signal as an error flag during at least a portion of a monitoring period in which a preset number of read commands are input, after the number of times that the error correction signal is generated during the monitoring period reaches a threshold,
   wherein the error correction signal is generated when the error in the data read in response to the read command is correctable and the error of the read data is corrected.

6. An operation method of a semiconductor memory apparatus, comprising the steps of:
   detecting an error from data read from a memory cell array in response to a read command;
   outputting an error correction signal corresponding to each of read command whenever an error is corrected;
   entering a flag output mode when the number of times that the error correction signal is generated during a monitoring period in which a preset number of read commands are input reaches a threshold; and
   outputting the error correction signal as an error flag in the flag output mode,
   wherein the error correction signal is generated when the error in the data read in response to the read command is correctable and the error of the read data is corrected.

7. The operation method according to claim 6, wherein the flag output mode is initially entered in a first monitoring period and is continuously maintained in the flag output mode until at least the first monitoring period after the initially entered.

8. The operation method according to claim 6, wherein the flag output mode enabled in a first monitoring period is retained during the first monitoring period and a tracking monitoring period.

9. The operation method according to claim 8, wherein the tracking monitoring period is set to a second monitoring period following the first monitoring period.

10. A memory system comprising:
    a semiconductor memory apparatus; and
    a memory controller configured to control the semiconductor memory apparatus,
    wherein the semiconductor memory apparatus comprises:

a memory cell array;

an ECC (Error Check and Correction) circuit configured to detect an error from data read from the memory cell array in response to a read command, correct the detected error, and output an error correction signal corresponding to each of read command whenever an error is corrected; and an EF (Error Flag) generator configured to enter a flag output mode when the number of times that the error correction signal is generated during a monitoring period in which a preset number of read commands are input reaches a threshold, and generate the error correction signal and output the error correction signal as an error flag to the memory controller in the flag output mode, wherein the error correction signal is generated when the error in the data read in response to the read command is correctable and the error of the read data is corrected.

11. The memory system according to claim 10, wherein the flag output mode is initially entered in a first monitoring period and is continuously maintained in the flag output mode until at least the first monitoring period after the initially entered.

12. The memory system according to claim 10, wherein the flag output mode enabled in a first monitoring period is retained during the first monitoring period and a second monitoring period following the first monitoring period.

\* \* \* \* \*